United States Patent [19]

Vogt et al.

[11] 4,258,943
[45] Mar. 31, 1981

[54] FLUID LINE CONNECTION DEVICE

[75] Inventors: Peter Vogt; Rainer Hoh, both of Schweinfurt, Fed. Rep. of Germany

[73] Assignee: Fichtel & Sachs AG, Schweinfurt, Fed. Rep. of Germany

[21] Appl. No.: 958,413

[22] Filed: Nov. 7, 1978

[30] Foreign Application Priority Data

Nov. 16, 1977 [DE] Fed. Rep. of Germany ...... 2751208

[51] Int. Cl.³ .................................................. F16L 19/00
[52] U.S. Cl. ................................... 285/340; 285/348
[58] Field of Search .................. 285/340, 348; DIG. 3

[56] References Cited

U.S. PATENT DOCUMENTS

| 2,904,355 | 9/1959 | Creamer | 285/348 X |
| 2,999,701 | 9/1961 | Blair et al. | 285/348 X |
| 3,058,762 | 10/1962 | Howe | 285/340 |
| 3,116,945 | 1/1964 | Blomquist | 285/340 X |
| 3,365,219 | 1/1968 | Nicolaus | 285/340 |
| 3,429,596 | 2/1969 | Marshall | 285/340 |
| 3,434,744 | 3/1969 | Yoke et al. | 285/340 X |
| 3,545,794 | 12/1970 | Wise | 285/340 X |
| 3,697,102 | 10/1972 | Falke | 285/340 |
| 3,894,758 | 7/1975 | Smith | 285/340 X |
| 4,084,843 | 4/1978 | Gassert | 285/340 X |

FOREIGN PATENT DOCUMENTS

| 2160105 | 7/1972 | Fed. Rep. of Germany . | |
| 2622269 | 11/1977 | Fed. Rep. of Germany | 285/340 |
| 551006 | 2/1943 | United Kingdom | 285/340 |

Primary Examiner—Thomas F. Callaghan
Attorney, Agent, or Firm—Toren, McGeady and Stanger

[57] ABSTRACT

A device for joining two fluid flow lines includes a pair of connection members threadly engaged to enable a pair of internal abutment surfaces to be moved together when a connection is to be made. A tubular member constituting the terminal end of one of the two fluid flow lines to be placed in flow communication is inserted into the connection device and a clamping member arranged between the abutment surfaces is caused to produce a clamping effect on the tubular member as the two connection members are moved toward each other by threaded engagement therebetween. The clamping member includes a clamping element which will extend obliquely to the axis of the tubular member when in an uncompressed state, with compression thereof by the abutment surfaces causing the clamping element to move toward an orientation perpendicular with the axis of the tubular member whereby a clamping effect is established.

8 Claims, 7 Drawing Figures

FLUID LINE CONNECTION DEVICE

BACKGROUND OF THE INVENTION

Briefly, the present invention relates to fluid flow transmission devices and more particularly to a device which will enable interconnection in flow communication of two fluid flow lines in a manner which is relatively simple and easy to effect. The invention relates to a fluid flow connection device which is particularly suitable for use with shock absorbers having an air suspension system. Normally, such shock absorbers are supplied with compressed air from a compressed air source through a supply line which is formed as an essentially tubular hose or pipe. Such a supply line must be releasably connected with the air suspension pressure chamber of the shock absorber in order to provide the compressed air thereto.

In shock absorber systems of the prior art utilizing air suspension systems, known for example from German Offenlegungsschrift No. 2,160,105, known air line connections operate to connect the air supply line by forming a securing device of the type utilizing clamping tongs. In order to form such clamping tongs, a connection piece is provided with an inclined surface with a cap nut, having an elastic flange section operating to engage the inclined surface of the connecting piece in order to exert a radial force onto the supply line during tightening. Structures of this type involve a disadvantageous design of the engaging parts because these parts must be constructed with rather exacting standards in order to insure that the required clamping effect is obtained and in order to avoid excessive compression or squeezing of the supply line during tightening which would adversely effect the proper functioning of the device. Sealing of the supply line in the connecting piece of this type of device is also problematic since, due to the inclined surfaces in the connecting piece and at an elastic flange section, axial pretensioning of a sealing ring of the connecting assembly cannot be insured with this type of connecting device. Accordingly, care must be taken during assembly that that part of the cap nut which is provided with the part constructed by clamping tongs is not overly tightened as to avoid excessive compression of the supply line. Furthermore, inadequate tightening must also be avoided in order to insure that the sealing effect which is obtained is adequate to secure the supply line within the connecting piece.

The present invention is directed toward providing a connection device for fluid flow lines which will be rather simple in design and inexpensive in its construction costs in order to facilitate easy assembly and secure joinder of fluid flow lines with a high functional safety while allowing simple disassembly without destruction of parts.

SUMMARY OF THE INVENTION

In accordance with the present invention, a clamping element is arranged between two stop or abutment faces of a connection device, with the abutment faces extending essentially perpendicularly to the axis of a tubular conduit which is to be inserted into the connection device for clamping therein. The clamping member comprises tongues or clamping elements with each tongue acting on the tubular conduit with that end of the tongue facing inwardly toward the axis of the conduit with the tongues, in an uncompressed state they extend obliquely relative to the stop faces. The clamping member involves relatively simple design features and operates to effect efficient securing of the supply line conduit when the distance between the two stop or abutment faces is reduced by screwing a cap nut which consists of one of two connecting members of the connecting device. Thus, as the abutment faces are brought closer together, the tongues or clamping elements of the clamping member will bear more tightly against the stop faces. In doing so, the ends of the tongues perform a radial movement toward the inside and they are pressed securely against the supply line with their inner end faces. Accordingly, a simple and inexpensive clamping member operates to facilitate a simple assembly and a simple disassembly without destruction of parts. In addition, the connecting piece and the cap nut constitute simple components and the stop or abutment faces do not require a high accuracy with regard to relative adjustment.

The clamping member arranged between the stop faces effects a high operational safety of the air or fluid line connection since the supply line is efficiently secured and can no longer be pulled out of the connecting piece when the cap nut is tightened. The cap nut, the end face of the connecting piece or an intermediate piece which may also be utilized in the assembly will not require any specific design configuration since, in accordance with the invention, a stop face for the clamping member is formed in a simple manner by the inner end face of the cap nut while the other stop face is formed by the end face of the connecting piece or by the end face of the alternatively utilized intermediate piece. Accordingly, all components are of relatively simple design and inexpensive to manufacture.

A rather high operational safety is obtained in a rather simple manner and, according to additional features of the invention, the clamping member is constructed to provide an essentially plane stop for a sealing element arranged in a recess of the connecting piece forming the second of the two connection members. Alternatively, the sealing element may be arranged in the recess of an intermediate piece. The recess serves to receive the sealing element and is formed with a shorter axial length than the sealing element. Accordingly, the clamping member may operate to have two functions. First, the clamping member operates to hold the supply line in the connection device. However, the clamping member may also serve as a stop for the sealing element between the connection and supply line. Additionally, it is possible in a simple manner to mount the sealing element in a pretensioned state in the recess of the connecting piece when this recess has a shorter axial length than the sealing element and the clamping member presses the sealing element into the recess.

It will be apparent that a rather simply designed clamping member may be utilized with the clamping member being a conical or crowned disk which, because of several radially extending incisions or slits, may be formed with clamping elements or tongues whose diameter is reduced when the clamping member is compressed in the axial direction between the stop faces. As a result, the inner ends of the tongues will be securely pressed against the supply line or tubular conduit which is inserted into the connection device for clamping.

Another advantageous embodiment of the clamping member may be obtained, in accordance with the invention, by forming the clamping member as a clip-like component having a bottom portion which is provided with a bore for passing therethrough the tubular conduit supply line and which forms a stop for the sealing element which is arranged in the recess. The clamping member may be provided with bent lugs which are part of the clamping member with the lugs forming the clamping elements or tongues. The free ends of the lugs will come into contact with the tubular supply line by a reduction of the distance from the axis.

Production of such a clamping member is rather simple an inexpensive since, in accordance with a feature of the invention, the clamping member may have only two oppositely located clamping tongues which are formed by a plane sheet metal strip, each tongue having a clamping surface at its end. In accordance with the invention, the clamping surface of each tongue is formed in a simple manner to define a rectangular recess within which the tubular conduit or supply line may be held in a clamped engagement.

In accordance with a further feature of the invention, the clamping member is made to be resilient thereby enabling the clamping member to resume its initial position after unscrewing of the cap nut of the connection device, as a result of which the tongues of the clamping member will release the supply line. Of course, it is also easily possible to design the clamping member in such a manner that it maintains its shape obtained during tightening of the cap nut after the cap nut is unscrewed and, thus, remains connected to the supply line. Also, in this case, it is possible to exchange the sealing element if leaks occur and this exchange may be effected without requiring utilization of a new clamping member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which are illustrated and described preferred embodiments of the invention.

DETAILED DESCRIPTION OF PREFERRED EMBODIMENTS

Figure 1:
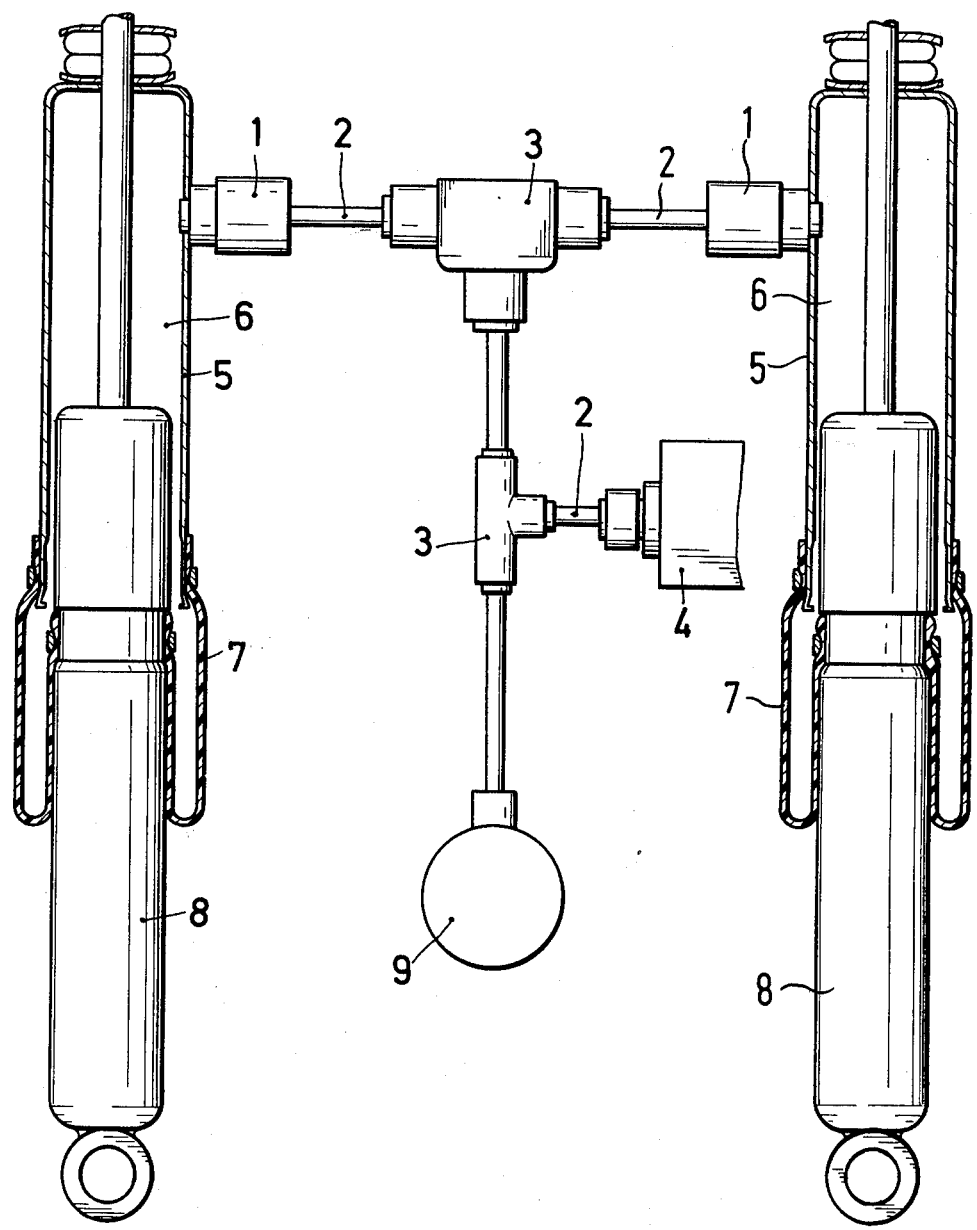
FIG. 1 is a schematic representation partially in section showing a system for connecting a shock absorber to a source of compressed air wherein a connection device embodying the present invention may be utilized.

Referring now to the Drawings, wherein like reference numerals are used to refer to similar parts throughout various figures thereof, and referring now specifically to FIG. 1, there is shown an overall system for an air suspension type of shock absorber wherein air may be supplied to a shock absorber 8 from a compressed air source 4. A connection device 1 operates as a fluid flow interconnection member with the device 1 being provided with a connecting piece which is made of metal and which is soldered into a protective tube 5 of the shock absorber 8. Between the protective tube 5 and the shock absorber 8 there is mounted an elastic bellows 7, these parts forming a pressure chamber 6 for the air suspension system of the shock absorber. The compressed-air source 4 is formed, for example, by a compressor which also includes an air line connection and is connected to the pressure chamber 6 through supply lines 2 and through T connections 3. The pressure prevailing in the pressure chamber 6 may be indicated by a pressure gauge 9 and the T connections 3 may be formed of plastic material.

Figure 2:
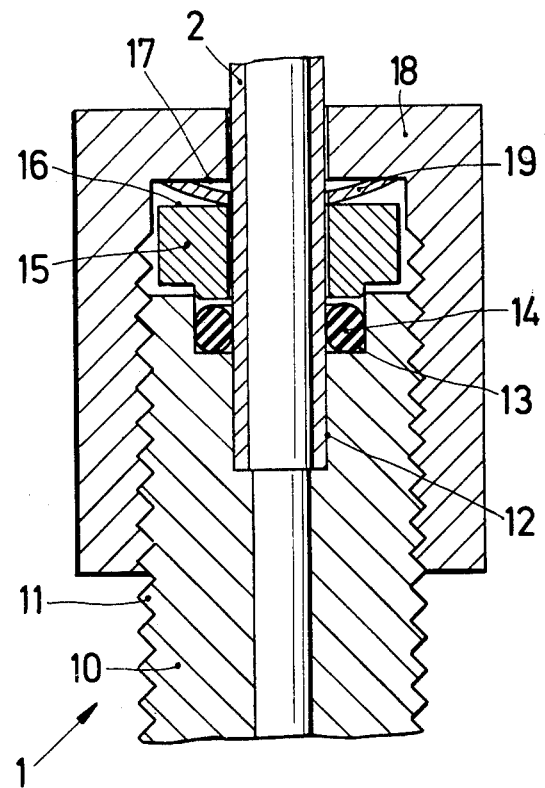
FIG. 2 is a sectional view showing a connection device in accordance with the present invention.

The connection device 1 is shown in greater detail in FIG. 2 as consisting of a pair of connection members 10 and 18. The connection member 10 comprises a connecting piece having an external thread 11 and a central bore 12 which engages the supply line 2. It will be noted that the supply line 2 essentially comprises a tubular conduit member having a central axis forming the terminal end of one of two fluid flow lines which are to be interconnected. A sealing ring 14 is arranged in a recess 13 defined in the connecting piece 10. A clamping member 19 is arranged between a stop face 16 of an intermediate piece 15 and a stop face 17 of the connection member 18 which is formed as a cap nut. Thus, it will be evident that the clamping member 19 is arranged between the stop faces 16 and 17 and bears against each of these faces.

Depending upon its arrangement, the connecting piece 10 may be made of metal or of plastic material. It will be evident that the tubular conduit constituting the supply line 2 may be connected within the connecting piece in a relatively simple manner merely by inserting the supply line 2 within a central bore 12 formed in the connecting piece 10.

In the assembly of the connecting device of the invention, the cap nut 18 may, first of all, be mounted upon the supply line 2. Subsequently, the clamping member 19, the intermediate piece 15 of the sealing ring 19 may be fitted onto the supply line 2. The supply line 2 may now be inserted into the central bore 12 of the connecting piece 10 with the connecting piece 10 being tightened by engagement of an external thread 11 of the connecting piece 10 with an internal thread formed on the cap nut 18.

FIG. 2 shows the clamping member 19 in an uncompressed state, wherein it may lie loosely between the stop face 16 of the intermediate piece 15 and the stop face 17 of the cap nut 18. When the cap nut 10 is tightened further, by threaded engagement with the connecting piece 10, the projection of the intermediate piece 15 located on the side thereof adjacent the sealing element 14 will penetrate into the recess 13 and will operate to pretension the sealing element 14 in an axial direction. Simultaneously, the distance between the stop face 16 and the stop face 17 will be reduced so that the clamping member is thus clamped between the stop or abutment faces 16, 17. It will be apparent as the clamping operation proceeds, the clamping member 19 will essentially comprise an element oriented to extend obliquely to the central axis of the tubular conduit or supply line 2. As the faces 16 and 17 are brought closer together, the clamping member 19 will undergo an orientation change whereby it will begin to arrange itself to extend perpendicularly to the axis of the supply line 2. As a result, the inner diameter of clamping member 19 will tend to become clamped about the outer side of the supply line or conduit 2.

Figure 3:
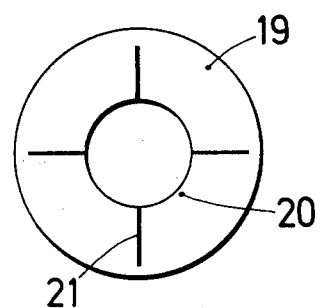
FIG. 3 is a plane view of a clamping member which may be utilized in the connection device shown in FIG. 2.

FIG. 3 depicts the clamping member 19 and shows that this member may be formed with four tongues or clamping segments 20 which are formed between four incisions or slits 21 extending radially in the clamping member 19. Accordingly, the radially inner ends of the tongues 20 will project and press against the outer surface of the supply line or conduit 2 when the clamping member is clamped between the stop faces 16 and 17 and the ends of the tongues 20 will hold the supply line in a clamped position within the connection device of the invention.

Figure 4:
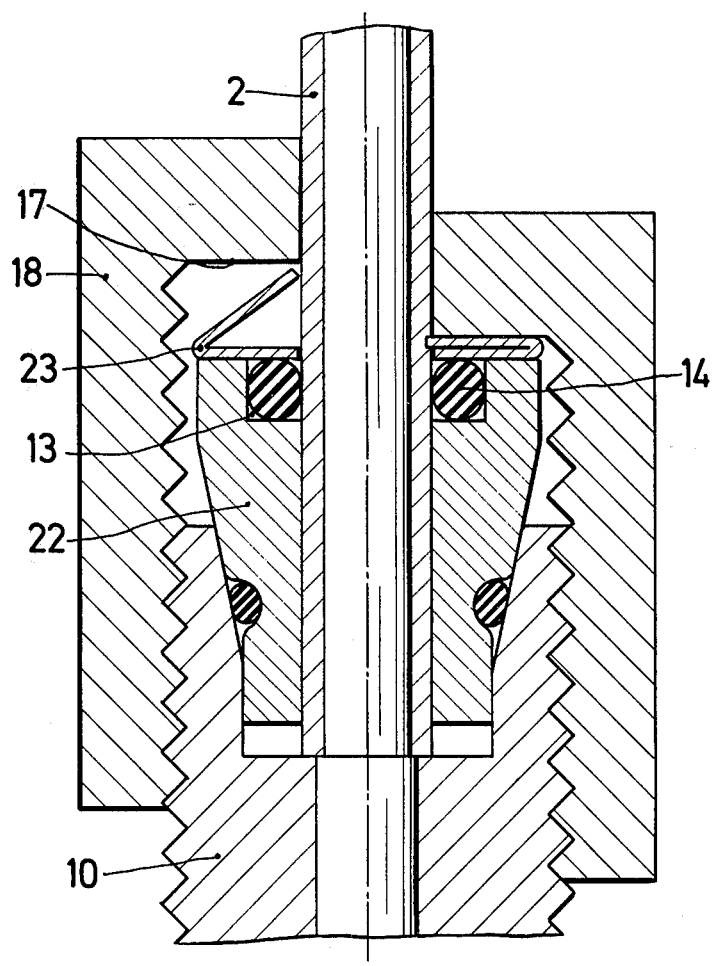
FIG. 4 is a sectional view showing an alternative embodiment of a connecting device in accordance with the invention.

In FIG. 4 there is shown another embodiment of the invention wherein an intermediate piece 22 is utilized with the intermediate piece 22 being shaped to conform with the configuration of an existing connecting piece 10. The intermediate piece 22 is formed with a conically shaped exterior which engages with a correspondingly shaped internal conical surface of the connecting piece 10, with a sealing ring being interposed therebetween. In this manner, it is possible to effect appropriate adjustments to various air line connections without difficulty. The intermediate piece 22 is formed with a recess 13 for receiving the sealing element 14 with a clamping member 23 being engaged between the upper face of the intermediate piece 22 and the stop face 17 of the cap nut 18. FIG. 4 depicts, on the left side thereof, the clamping member 23 is shown in its uncompressed state and it will be clear therefrom that the tongues or clamping elements of the clamping member 23 extend obliquely relative to the stop faces 17, or relative to the central axis of the tubular supply line 2. On the right hand side of FIG. 4 the clamping member 23 is shown in its compressed state with the cap nut 18 being threadedly tightened onto the connecting piece 10 and it will be seen that the tongues or clamping elements of the clamping member 23 are not oriented to extend generally perpendicularly to the central axis of the supply line 2 so that the clamping elements of the clamping member 23 at their radially inner ends will press against the supply line 2. Depending upon the material of the supply line 2, the tongues may, if desired, slightly penetrate the surface of the supply line 2. As a result, the supply line 2 will be secured against removal from the connecting device.

Figure 5:
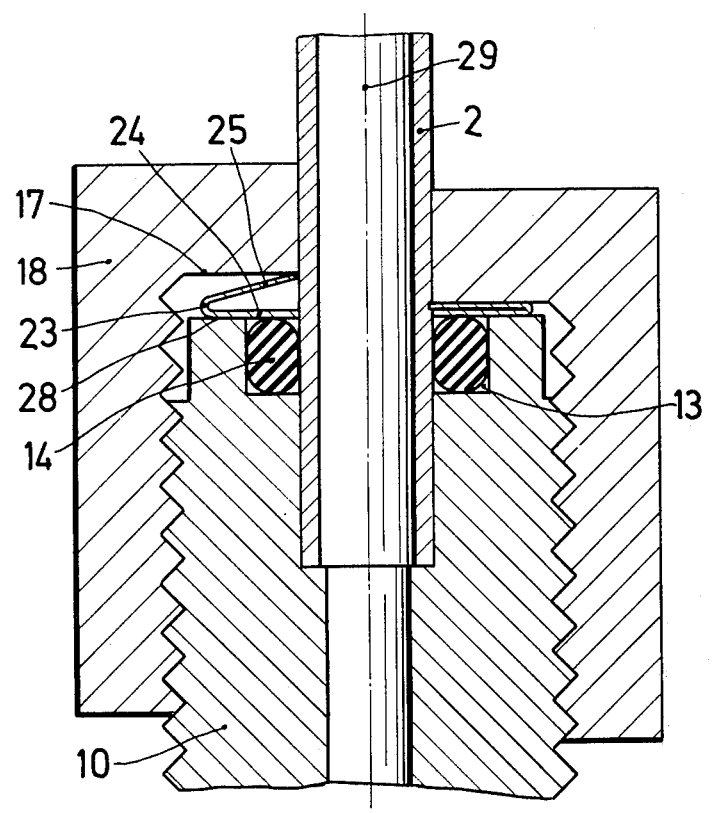
FIG. 5 is a sectional view of a further embodiment of the invention utilizing a clip-like component as the clamping member.

In FIG. 5 there is shown a further embodiment of the invention wherein the connecting piece 10 is provided with a stop face 28 against which the clamping member 23 bears with a bottom portion 24 thereof. The bottom portion 24 simultaneously operates to provide a stop for the sealing element 14 which is arranged in the recess 13. Again, in the case of FIG. 5, the lefthand side thereof shows the clamping member in its uncompressed state between the stop face 28 of the connecting piece 10 and the stop face 17 of the cap nut 18. When the cap nut 18 is tightened, tongues or clamping elements 25 of the clamping member 23 are pressed downwardly and, thus, the distance between the radially inner free ends of the tongues 25 and the axis 29 of the supply line 2 will be reduced. On the righthand side of FIG. 5 is shown the condition wherein the connecting device of the invention is in its tightened state with the cap nut 18 threadedly engaged to press upon the tongues 25 in order to secure the radially inner ends of tongues 25 against supply line 2 and to penetrate slightly into the surface of the supply line.

Figure 6:
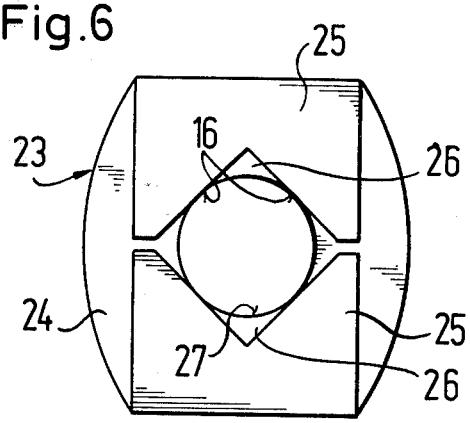
FIG. 6 is a top view of one embodiment of the clamping member of the invention.
Figure 7:
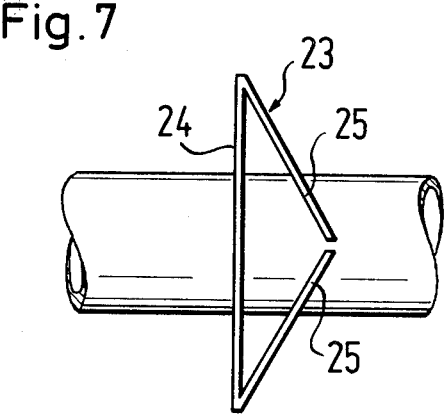
FIG. 7 is a side view of the clamping member.

FIG. 6 depicts a top view of the clamping member 23 showing in better detail the two oppositely located tongues 25. The tongues 25 are arranged to be integrally formed with the bottom portion 24 thereby forming the clamping member 23 in a one-piece configuration and the bottom portion 24 is formed with a bore 27 to enable passage therethrough of the supply line 2. The clamping surfaces of the tongues 25 at their radially inner free ends are formed with a V-shape in order to define therebetween a rectangular recess 26. In order to ensure efficient spring action of the tongues 25, a preferred embodiment shown in FIG. 7 is formed with the tongues 25 of the clamping member 23 arranged at the bottom portion 24 in such a manner that the joinder therebetween extends at an acute angle whereby no radius is formed at this location.

Due to the fact that the tongues 25 of the clamping member 23 or the tongues 20 of the clamping member 19 have a small axial height at their inner, free ends, a high surface pressure may be exerted onto the supply line 2 by means of the clamping of the connection members 10 and 18. As a result, an efficient connection of the supply line 2 within the connection device of the invention may be obtained. Accordingly, for each type of application, the forces that will act on the supply line may be easily varied by changing, for example, the angle between the tongues and the bottom portion of the clamping member whereby a more or less high clamping pressure may be obtained. Also, the thickness of the material of the clamping member may be varied in order to enable it to absorb higher or lower forces in the radial direction.

Furthermore, it will be evident that the connecting device of the invention may be utilized for air line connections but that it may also be used for other types of fluid lines, particularly for hydraulic lines and water lines.

While specific embodiments of the invention have been shown and described in detail to illustrate the application of the inventive principles, it will be understood that the invention may be embodied otherwise without departing from such principles.

What is claimed is:

1. A device for connecting two fluid flow lines, particularly suited for joining a shock absorber with a supply line of a compressed air source, comprising: a first connection member and a second connection member forming therebetween a fluid flow passage between said two fluid flow lines; means for releasably interconnecting said first and second connection members; means defining in at least one of said first and second connection members a recess for receiving therein a tubular member constituting a terminal end of at least one of said two fluid flow lines; a sealing element arranged to extend about said tubular member; means defining a pair of opposed stop faces which are moved toward each other upon interconnection of said connection members; and a clamping member arranged between said opposed stop faces adapted to be brought into clamping engagement with the said tubular member by compression thereof between said stop faces; said clamping member being formed with a clip-like configuration including a bottom portion and lug means integrally formed with said bottom portion and extending obliquely therefrom, said bottom portion being provided with a bore therethrough to enable said tubular member to be passed through said bore with said lug means extending from said bottom portion with at least one radially inner end of said lug means adapted to be brought into abutting engagement against said tubular member when said clamping member is compressed in a manner tending to bring said lug means toward a parallel orientation with said bottom portion; said lug means being arranged to extend obliquely to the axis of said tubular member when said clamping member is in an uncompressed state between said stop faces and to be moved toward an orientation extending perpendicularly to said axis of said tubular member when compressed between said stop faces thereby to be brought to bear against said tubular member in clamping engagement therewith; a generally annular recess extending around said tubular member and having said sealing element contained therein, said bottom portion of said clamping member being arranged to overlie said annular recess and to apply a compressive force against said sealing element when said clamping member is compressed between said stop faces; said lug means comprising two oppositely located tongues formed of planar strips, each of said tongues having an inner clamping surface at its end located for engagement against said tubular member, said clamping surfaces of each of said tongues being formed with a substantially v-shaped configuration thereby to define therebetween a substantially quadrilateral recess within which said tubular member may extend for clamping engagement therein.

2. A device according to claim 1 further comprising an intermediate piece operatively arranged between said first and second connection members, with one of said pair of opposed stop faces being formed as an inner face of one of said connection members and with the other of said stop faces being formed as an end face of said intermediate piece.

3. A device according to claim 1 where said pair of opposed stop faces are formed, respectively, as an inner face of one of said first and second connection members.

4. A device according to claim 1 wherein said sealing element is arranged within a recess defined within said device and wherein said clamping member is constructed to define an essentially planar stop face for said sealing element.

5. A device according to claim 4 wherein said recess having said sealing element therein is formed with an axial length shorter than the axial length of said sealing element.

6. A device according to claim 1 wherein said clamping member is formed of resilient material.

7. A device according to claim 1 wherein said sealing element is compressed by said clip-like clamping member into sealing engagement between said one of said first and second connection members and said tubular member.

8. A device according to claim 1 wherein said lug means and said bottom portion are integrally joined together at an apex portion of said clamping member, said apex portion being unrestrained for movement to a limited extent radially of said tubular member upon compression of said clamping member.

* * * * *